(12) United States Patent
Mairou

(10) Patent No.: US 8,377,244 B2
(45) Date of Patent: Feb. 19, 2013

(54) METHOD OF FABRICATING A HONEYCOMB STRUCTURED PANEL

(75) Inventor: Joseph Mairou, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 64 days.

(21) Appl. No.: 13/031,886

(22) Filed: Feb. 22, 2011

(65) Prior Publication Data

US 2011/0203718 A1  Aug. 25, 2011

(30) Foreign Application Priority Data

Feb. 24, 2010  (FR) ...................................... 10 00753

(51) Int. Cl.
*B32B 37/12* (2006.01)
*B32B 38/10* (2006.01)
*B32B 3/12* (2006.01)

(52) U.S. Cl. .................. 156/243; 156/307.3; 156/307.7; 52/787.12; 428/117

(58) Field of Classification Search ................. 52/787.1, 52/787.11, 787.12
See application file for complete search history.

(56) References Cited

U.S. PATENT DOCUMENTS

| | | | | |
|---|---|---|---|---|
| 1,871,492 A * | 8/1932 | Brennecke | ............... | 264/272.18 |
| 3,578,526 A * | 5/1971 | Brennecke | ..................... | 156/242 |
| 3,917,299 A * | 11/1975 | Anderson | .................... | 280/607 |
| 4,074,608 A * | 2/1978 | Siebol | ............................. | 411/43 |
| 4,551,918 A * | 11/1985 | Smithberg | ...................... | 30/347 |
| 4,615,460 A * | 10/1986 | Buccellato et al. | ........... | 220/801 |
| 4,675,241 A * | 6/1987 | Hull | ............................. | 428/116 |
| 4,716,067 A * | 12/1987 | Moji et al. | .................... | 428/117 |
| 2008/0150342 A1* | 6/2008 | Kismarton et al. | ...... | 297/452.18 |
| 2009/0218076 A1* | 9/2009 | Mauduit | ................. | 165/104.14 |

FOREIGN PATENT DOCUMENTS

| DE | 10110996 A1 | | 9/2002 |
|---|---|---|---|
| EP | 1533433 A1 | * | 5/2005 |
| FR | 2106075 A1 | | 4/1972 |
| FR | 2891239 A1 | | 3/2007 |
| FR | 2896443 A1 | | 7/2007 |
| JP | 11348157 A | | 12/1999 |

OTHER PUBLICATIONS

Hexcel Composites: "Redux 200 Series" Internet Citation http://www.hexcel.com/NR/4donlyres/2690, dated Mar. 2007.
Search Report and Written Opinion; Application No. FR 1000753; dated Jul. 16, 2010.

* cited by examiner

Primary Examiner — William Bell
(74) Attorney, Agent, or Firm — Brooks Kushman P.C.

(57) ABSTRACT

A method of fabricating a panel (1) comprising a core (10) made of honeycomb material provided with a plurality of cells (13) and encased by top and bottom outer walls (20, 30), which method comprises, during a preparation stage (P1): fabricating the top outer wall (20); fabricating the bottom outer wall (30); fabricating said core (10), and perforating one internal orifice (11) per fastener element (50) in said core (10) so as to provide a space (12) for receiving said fastener element (50); and then coating at least one layer of a film of an intumescent adhesive (60) on a connection side wall (51) of said fastener element (50) that is to be connected to said core (10). After performing an assembly stage on a bench (70), the assembly comprising the top outer wall (20), the core (10) provided with said fastener element (50), and the bottom outer wall (30) is polymerized in order to obtain said panel (1) provided with said fastener element (50).

11 Claims, 3 Drawing Sheets

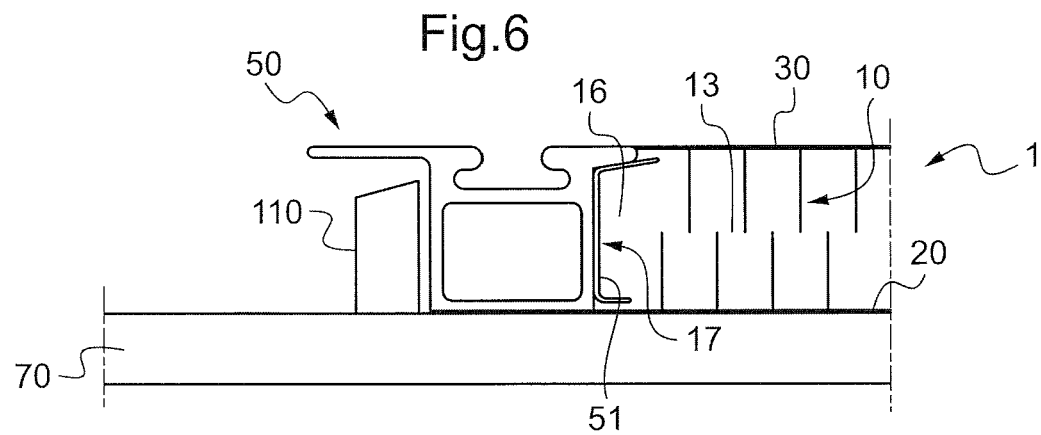
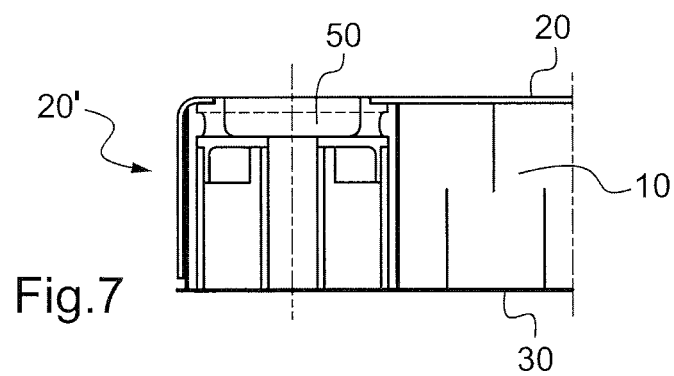
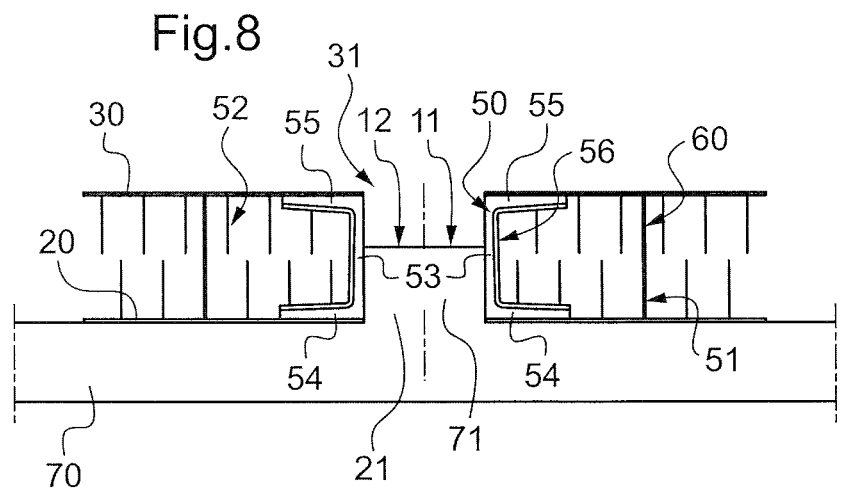

METHOD OF FABRICATING A HONEYCOMB STRUCTURED PANEL

CROSS REFERENCE TO RELATED APPLICATIONS

This application claims the benefit of FR 10 00753 filed on Feb. 24, 2010. The disclosure of which is incorporated in its entirety by reference herein.

BACKGROUND OF THE INVENTION (1) Field of the Invention

The present invention relates to a method of fabricating a honeycomb structured panel provided with at least one fastener element, e.g. a floor panel provided with at least one fastener element for fastening equipment of a vehicle. The invention also provides an aircraft panel fabricated by the method.

The invention thus lies in the field of fabricating cellular panels, and more particularly it lies in the field of fitting out vehicle cabins, in particular for flying vehicles such as aircraft, rotorcraft, airplanes, or other similar flying vehicles. More specifically, the present invention relates to fitting out floors for such vehicles, which floors are of laminated and honeycomb structure, and they incorporate fastener elements for fastening equipment of the vehicle, e.g. such as seats.

(2) Description of Related Art

In the field of fitting out vehicle cabins, and more particularly in rotorcraft, it is common practice to fit out the floor using panels that are arranged as a laminated structure. This panel structure comprises a cellular core that is thus implemented as a honeycomb and that is confined inside an enclosure formed using a top outer wall and a bottom outer wall of the panel. The enclosure is thus defined between the bottom and top outer walls that are placed around the honeycomb core so as to protect it and so as to form opposite planes respectively for supporting the panel and for supporting movement inside the vehicle cabin. The top and bottom outer panels may be made of metal or out of composite materials.

Since the floor panel has the potential of supporting cabin equipment, e.g. such as seats or any other appropriate equipment, it is common practice to incorporate fastener elements for such equipment in the floor structure. Such fastener elements are commonly inserts arranged as elongate members for locally receiving a complementary fastener element forming part of the equipment.

Civil certification regulations in force require seat fastener elements to withstand predefined load factors. Each floor panel and each fastener element must therefore be dimensioned so as to withstand such load factors.

In addition, the general techniques used for incorporating fastener elements must lead to only minimal increase in the weight of the floor, while nevertheless guaranteeing that they are incorporated in the floor panel in robust and long-lasting manner, and while also avoiding weakening the panel. Furthermore, fastener elements need to be incorporated so as to comply with safety constraints relating to the ability of the floor to withstand deformation, which constraints are particularly severe for flying vehicles, in particular in the event of a crash.

In a first method, during a first fabrication step, a composite panel which is not fitted with fastener elements is made. Thereafter, the bottom and top outer walls are placed on either side of a honeycomb core, which may be constituted by a metal honeycomb or by a composite honeycomb e.g. of the kind known under the name Nida NOMEX®, with films of adhesive being interposed between each of the outer walls and the core. Under such circumstances, the assembly is polymerized while hot so as to secure the core to the bottom and top outer walls on either side thereof.

During a second fabrication step following the first step, the panel is fitted with fastener elements, such as seat inserts, or inserts for fastening the panel to surrounding structures.

In order to fasten a blind insert the following steps are performed:

routing the bottom outer wall and/or the top outer wall to match the profile of the insert that is to be installed by using a routing jig so as to guarantee interchangeability;

stripping out the core situated between the outer walls so as to provide a space for receiving a fastener element, the stripped-out section of the core having dimensions that are greater than the dimensions of the sections routed in the outer walls;

sucking out the particles that remain in the cavities of the core that open out into said stripped-out space;

arranging a fastener element in said space using a positioning jig to guarantee interchangeability;

preparing a sealant mixture, e.g. based on epoxy resin;

injecting the sealant mixture so as to fill said space between said fastener element and the core; and causing the sealant mixture to set.

In order to fasten a through insert, the following steps are performed:

drilling one of the outer walls of the panel using a drilling jig to guarantee interchangeability;

stripping out the core situated between the bottom and top outer walls so as to provide a space for receiving a fastener element, the stripped-out section of the core having dimensions greater than the dimensions of the routed section in the outer wall;

sucking out particles that remain in the cavities of the core that open out into said stripped-out space;

preparing a sealant mixture, e.g. based on epoxy resin;

injecting the sealant mixture so as to fill said stripped-out space;

allowing the sealant mixture to set; and drilling right through the panel via said sealant mixture and then adhesively bonding cups to the top and bottom outer walls.

That first method nevertheless presents the drawback of requiring fabrication to be performed in two steps, namely fabricating the panel and then modifying the panel in order to incorporate fastener elements therein. This gives rise to relatively lengthy fabrication time, and to a wide variety of tooling being used, in particular to ensure that the fastener elements are properly positioned.

It should also be observed that the times required for injecting and setting the sealant product are also relatively lengthy, it also being difficult to distribute the mixture uniformly in the cavities of the cells that open out into the stripped-out space.

Document FR 2 106 075 describes installing a fastener element in a sandwich panel, the fastener element being provided with an outer flange and a tube. The tube is contained in an adhesive sheath, and is inserted in a hole made in the sandwich panel. The fastener element is adhesively bonded to the panel by heating the fastener element to melt the sheath which then bonds to the cells of the panel floor, to the wall of the panel that is in contact with the outer flange, and to the tube of the adhesive element.

The method implemented thus consists in initially fabricating the panel and then in fitting it out. It should also be observed that the flange of the fastener element projects from the panel. Furthermore, it should be observed that the time required for heating the fastener element is difficult to control. Consequently, there is a risk of damaging the surrounding zone of the previously-made panel.

Document JP 11-348157 also lies in the field of the invention.

SUMMARY OF THE INVENTION

An object of the present invention is thus to propose a method enabling the fabrication of a panel provided with fastener elements to be optimized.

According to the invention, a method of fabricating a panel comprising a core made of honeycomb material having a plurality of cells and encased by top and bottom outer walls defining between them an enclosure for receiving the core, said panel incorporating at least one fastener element that is accessible from at least one outer wall of the panel and that is suitable for co-operating with complementary fastener means of a structure, is remarkable in particular in that during a preparation stage the method comprises the following steps:

fabricating the top outer wall, and cutting out at least one outer orifice per fastener element that is to open out into the top outer wall;

fabricating the bottom outer wall;

cutting out a plate of honeycomb material to fabricate the core, and perforating one internal orifice per fastener element in the core in order to provide a space for receiving the fastener element; and coating at least one layer of a film of intumescent adhesive on a connection side wall of the fastener element that is to be connected to the core;

and then in said method, during an assembly stage following the preparation stage:

placing the top outer wall on a molding bench;

covering the top outer wall in a film of adhesive, and then applying the core against the top outer wall, the fastener element being arranged in the corresponding space in the core for receiving it equally well either during the preparation stage after perforating the internal orifice, or after the core has been arranged on the top outer wall;

covering the core in a film of adhesive and then applying the bottom outer wall against the core;

and then polymerizing the assembly comprising the top outer wall, the core provided with the fastener element, and the bottom outer wall, in order to obtain the panel provided with the fastener element.

It should be observed that each outer wall may be a metal wall or it may be a wall made of composite materials.

In order to polymerize the assembly, it is possible to place a vacuum bag around the molding bench and the assembled members of the panel, after which the bench is transferred into an autoclave to bake said assembly at a temperature of 180 degrees Celsius, for example.

The invention thus makes it possible for a panel that is fitted with structural fastener elements enabling the panel to be fastened to a surrounding carrier structure or enabling seats, for example to be fastened thereto, to be fabricated in a single process. It can be seen that each fastener element is incorporated in the core during fabrication of the panel, and not subsequent to fabrication of the panel.

Furthermore, the invention does not require the use of a sealant mixture, but recommends using a film of intumescent adhesive for connecting the side wall of a fastener element to a connection surface of the core.

Finally, the invention makes it possible to use a fastener element having a body and at least one flange, but without the flange projecting from an outer wall.

The method may also include one or more of the following additional characteristics.

For example, during the preparation stage, at least one outer orifice is cut out in the bottom outer wall. Thus, the through fastener element opens out to the outside via an outer orifice in the top outer wall and via an outer orifice in the bottom outer wall.

Optionally, at least one outer orifice is cut out while providing some minimum peripheral clearance in order to accommodate assembly tolerances. Under such circumstances, at least one outer orifice is cut out during the preparation stage of the single fabrication process so as to present first outside dimensions, which first outside dimensions are equal to the sum of the minimum peripheral clearance plus the second outside dimensions of the fastener element facing the outer wall in question. For example, the fastener element may be a cylinder, so the second outside dimension is the diameter of the cylinder and the first outside dimension is equal to the sum of said diameter plus the minimum peripheral clearance, which is of millimeter order.

Furthermore, the fastener element has given first internal dimensions, each internal orifice cut out in the core presents peripheral dimensions smaller than the first internal dimensions, being defined by a connection course of cells of the core, and the connection course of cells is pressed back so as to flatten at least the connection course of cells in order to obtain a smooth connection surface around the internal orifice.

Consequently, during the preparation stage, an internal orifice is drilled that is not large enough to receive the fastener element, its first internal dimensions being smaller than the peripheral dimensions of the fastener element. Under such circumstances, an operator presses back the connection course defining the internal orifice, e.g. a circular connection course.

Optionally, while pressing back the connection course, the operator levels out not only the cavities in the connection course, but also levels out the cavities in the course adjacent to the connection course.

This results in the first internal dimensions of the internal orifice being leveled and enlarged sufficiently to enable the fastener element to be introduced. Furthermore, the connection course then defines a connection surface that is smooth instead of a connection surface that includes cavities. This improves adhesion between the film of intumescent adhesive on the side wall of the fastener elements and the connection surface of the core.

This characteristic is particularly innovative since it appears surprising to cut an internal orifice out in the core that is initially not suitable for receiving the fastener element.

Furthermore, after a fastener element has been inserted in a space for receiving it during the preparation stage or the assembly stage, as appropriate, the core is docked around the fastener element so as to minimize a gap between the connection course and a film of intumescent adhesive surrounding the side wall of the fastener element.

It is recalled that docking is an operation during which two elements are moved towards each other. Thus, the operator presses back the connection course so as to enable the fastener element to be inserted, and then moves the connection course towards the side wall of the fastener element in order to minimize the gap between the connection course and said fastener element.

Similarly, during the preparation stage, said plate includes a peripheral course of cells, and said peripheral course of cells is pressed back to level at least said peripheral course and obtain a smooth peripheral surface. Optionally, the peripheral course is pressed to level the peripheral course and the course that is adjacent thereto.

Furthermore, it is possible to cut the peripheral course of cells to a chamfer so as to facilitate putting a specific fastener element into place.

Under such circumstances, the peripheral course is coated in at least one layer of a film of intumescent adhesive and then an outer rule is applied against the peripheral course.

In addition, prior to putting at least one layer of film of intumescent adhesive into place around the side wall of the fastener element, roughness is formed in the side wall. The roughness may be obtained by making grooves in the side wall or by using a knurled side wall, for example.

The roughness encourages bonding of the film of intumescent adhesive.

In another aspect, the bench has at least one positioning peg for positioning a fastener element, and during the assembly stage, the fastener element is positioned around the positioning peg. There is thus no need for specific tooling for positioning each fastener element.

Optionally, after placing the bottom outer wall on the core, the bottom outer wall is covered in covering tooling to provide distributed pressure on the bottom outer wall. The bottom outer wall then does not risk being damaged by a fastener element.

Furthermore, the fastener element comprises a body for positioning in the core, and during the preparation stage, a complementary cellular structure provided with the side wall is arranged around the body, at least one layer of a film of intumescent adhesive being arranged between the body and the complementary cellular structure.

Thus, in a variant, the side wall is a wall of the body of the fastener element.

Conversely, in another variant, the side wall is a portion of a complementary cellular structure arranged against said body. This characteristic is particularly advantageous for fastener elements that are in the form of a T-shape or an H-shape on its side and provided with a body that leads to a flange.

Finally, it is possible to protect the fastener element using a removable protective film that is suitable for being withdrawn after polymerization.

In addition to the above-described method, the invention also provides an aircraft panel comprising a core made of honeycomb material having a plurality of cells and encased by top and bottom outer walls defining between them an enclosure for receiving the core, the panel incorporating at least one fastener element. The panel is remarkable in particular in that it is fabricated by applying said method of the invention.

BRIEF DESCRIPTION OF THE DRAWINGS

The invention and its advantages appear in greater detail in the context of the following description of embodiments given by way of illustration and with reference to the accompanying figures, in which:

FIG. 6 is a diagram showing a fastener element being put into place against a peripheral course in a first variant arrangement at the periphery of a fastener element;

FIG. 7 is a diagram showing the placing of a fastener element against a peripheral course in a second variant arrangement at the periphery of a fastener element; and FIG. 8 is a diagram showing the placing of a fastener element in the form of H on its side.

DETAILED DESCRIPTION OF THE PREFERRED EMBODIMENT

Elements present in more than one of the figures are given the same references in each of them.

Figure 1:
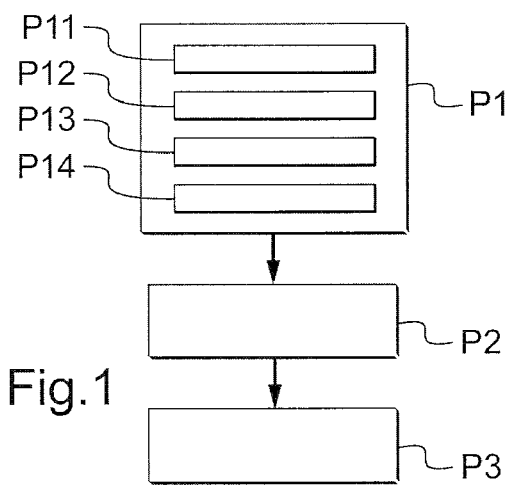
FIG. 1 is a diagram presenting the stages of the method.

FIG. 1 is a diagram explaining the method of the invention for fabricating a panel provided with a honeycomb core coated between a top outer wall and a bottom outer wall. The panel also includes at least one fastener element for fastening to complementary fastener means of the structure, e.g. equipment such as a seat or a load-carrying structure.

Thus, during a preparation stage P1, the various component members of the panel are fabricated.

During a step P11, the top outer wall is fabricated. During another step P12, the bottom outer wall is fabricated. Then, during a step P13, the core is fabricated, and during a step P14, each fastener element that is to be connected to the core is prepared.

It should be observed that the various steps P11, P12, P13, and P14 of the preparation stage may be performed simultaneously by different pieces of equipment in order to minimize preparation time.

During an assembly stage P2, the assembly comprising the top outer wall, the core provided with the fastener element, and the bottom outer wall, is itself assembled on a bench.

Finally, during a baking stage P3, said assembly is polymerized so as to obtain directly a panel that is fitted with fastener elements.

Figure 2:
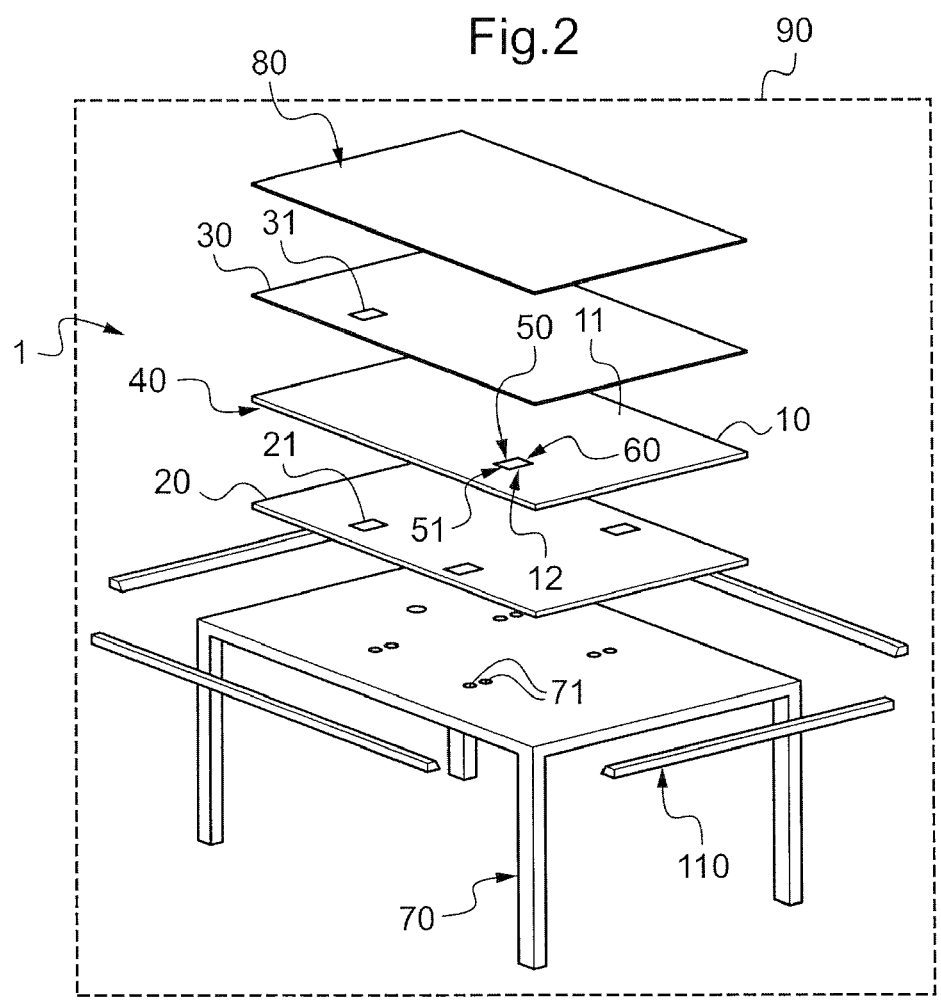
FIG. 2 is a diagram explaining the assembly and polymerization stages.

With reference to FIG. 2, during the preparation stage P1, the top outer wall 20 is fabricated, which top outer wall 20 may possibly be a metal wall, or may indeed be a wall made of composite material. Furthermore, at least one outer orifice 21 is cut out per fastener element 50 that is to end up opening out to said top outer wall 20.

It should be observed that the outer orifice 21 is advantageously cut out while taking into consideration some minimum peripheral clearance, of the order of one millimeter. For example, if the portion of the fastener element that co-operates with the outer orifice is a disk having a diameter of 30 millimeters, a circular outer orifice is cut out having a diameter equal to the diameter of said portion plus the minimum peripheral clearance, i.e. a diameter of 31 millimeters, for example.

A bottom outer wall 30 is also fabricated. Like the top outer wall 20, at least one outer orifice 31 is cut out therein per fastener element 50 that is to open out into said bottom outer wall 30.

In addition, the panel that is to be fabricated needs to include a core 10 having a cellular structure referred to as a "honeycomb" structure by the person skilled in the art, the core 10 being encased by the top and bottom outer walls 20 and 30. Thus, the core 10 needs to be placed in a receiver enclosure 40 defined by the top and bottom outer walls 20 and 30.

Then, during a step P13 of the preparation stage P1, the core 10 is cut out from a honeycomb sheet. One internal orifice 11 is then perforated per fastener element 50 that is to be arranged in the core 10, each internal orifice 11 constituting a space 12 for receiving a fastener element 50.

During a step P14 of this preparation stage, at least one layer of an intumescent adhesive film 60 is placed against a side wall 51 of each fastener element 50 that is to be fastened to the core 10.

It should be observed that in a variant, the fastener element 50 carrying the film of intumescent adhesive 60 is placed against the side wall 51 in the internal orifice 11 that is to receive it.

With reference to FIG. 2, when the various members of the panel have been prepared, the assembly stage P2 is performed using a bench 70, e.g. a table provided with at least one positioning peg 71 for positioning a fastener element 50.

Initially, the top outer wall 20 is placed against the bench 70 with at least one positioning pin passing through an outer orifice 21 in said top wall 20. Once a first face of said top outer wall 20 is in contact with the bench 70, a second face of said top outer wall 20 opposite from said first face of said top outer wall 20 is covered in a film of adhesive.

Positioning using at least one positioning peg of the bench 70 serves to guarantee that the panel is thoroughly reproducible. Each fabricated panel then complies with its theoretical definition.

An operator then applies the core against the adhesive-covered face of the top wall 20.

If the fastener elements 50 have been placed in the core 10 during the preparation stage, the core is positioned so as to cause said fastener elements 50 to co-operate with the corresponding positioning pegs 71.

On the contrary, in an alternative variant, each fastener element 50 is placed in a receiver space 12 of the core 10 during the assembly stage. Care is then taken to arrange the fastener elements by positioning them with the help of the positioning pegs 70.

It should be observed that the invention does not require complex positioning tooling for the purpose of positioning the fastener elements, a simple peg on the bench suffices.

With a first face of the core 10 in contact with the top outer wall 20, a second face of the core 10 opposite from said first face of the core 10 is covered in a film of adhesive.

The operator then places the bottom outer wall 30 against the adhesive-covered face of the core.

If the bottom outer wall 30 is provided with one or more outer orifices 31, it is possible to position the bottom outer wall 30 with the help of the positioning pegs 70 of the bench.

In an alternative variant, use is made for example of studs provided on the bench for this purpose.

Similarly, it is possible to implement holder bars 110 or any other conventional means for holding the various members of the future panel 1 in position.

During this stage, an operator may place a vacuum bag 90 around the bench and the members constituting the panel in order to proceed with polymerization of the panel 1 in an autoclave, e.g. at 180 degrees Celsius.

Nevertheless, in order to avoid the bottom panel 30 being damaged by a fastener element 50 when a vacuum is established, an operator may place covering tooling, e.g. a plane plate 80, on the bottom outer wall 30.

The operator then puts the vacuum bag into place and proceeds with polymerization.

At the end of baking, a panel is thus obtained directly, e.g. an aircraft panel, comprising a core 10 made of honeycomb material having a plurality of cells and encased by a top outer wall 20 and a bottom outer wall 30 defining between them an enclosure 40 for receiving the core, the panel incorporating at least one fastener element 50.

Figure 3:
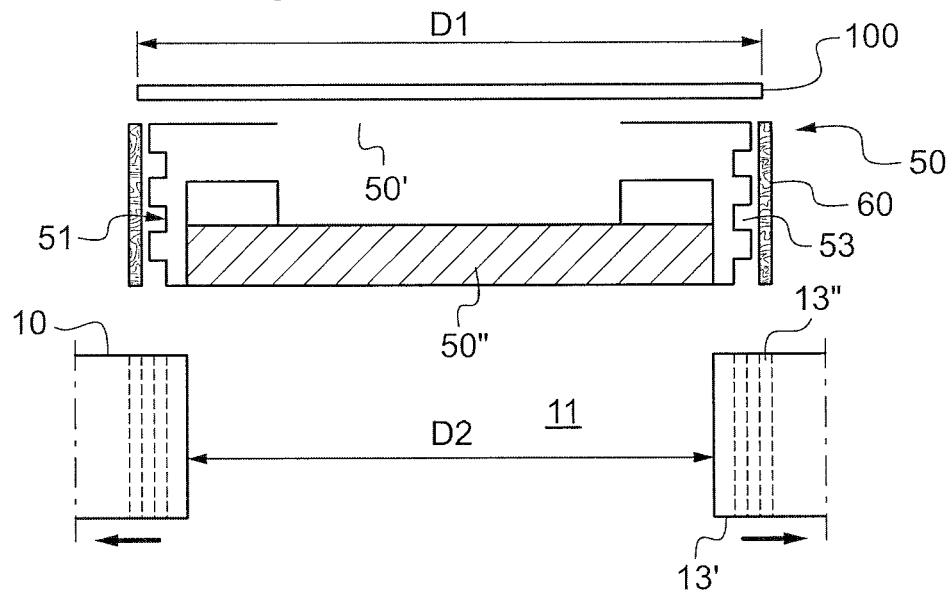
FIGS. 3 to 5 are diagrams explaining a variant seeking to press back a connection course of the core.
Figure 4:
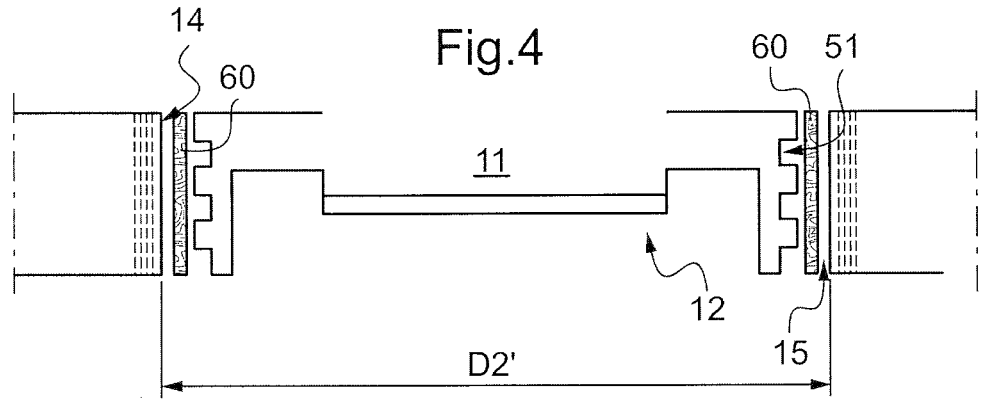
Figure 5:
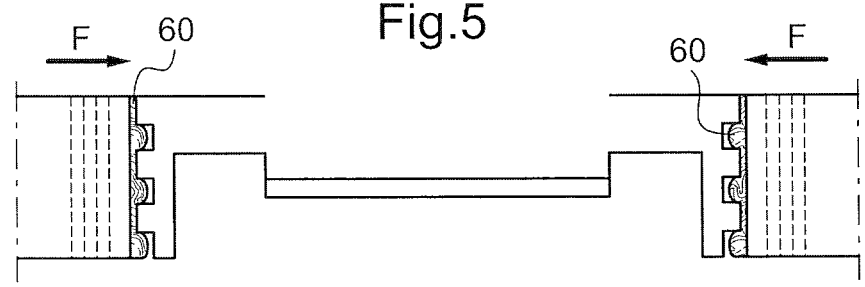

FIGS. 3 to 5 show a variant for optimizing the arrangement of a fastener element 50 in an internal orifice 11 of the core 10.

Independently of the variant, the fastener element 50 shown has an upside-down U-shaped channel section and it includes a fastener point 50'. A block 50" made of a cellular structure may be placed in a cavity of the fastener element.

In addition, the fastener element may be elongate, or circular, or indeed oblong in shape when seen from above.

Furthermore, roughness 53 is formed on the side wall 51 in order to enhance retention of a film of intumescent adhesive 60. Thus, the side wall 51 may be grooved or knurled.

Finally, it should be observed that it is possible to cover the fastener element in a removable adhesive protective film 100. Advantageously, the protective film projects from the fastener element in order to protect the tooling and the fastener elements by preventing the film of adhesive from running.

With reference to FIG. 3, the fastener element has given peripheral dimensions. For example, the fastener element is circular and it describes a circle of diameter D1.

During the preparation stage, and with reference to FIG. 3, an operator then pierces an internal orifice in the core 10, the orifice having first internal dimensions that are less than the given peripheral dimensions. In the context of the present example, it comprises a cylinder of section having a diameter D2 that is less than the diameter D1 of the fastener element 50.

It can be understood that it is not possible to put the fastener element into place under such conditions.

Thereafter, during the preparation step P13, the operator presses back the connection course 13' of cells that define the internal orifice 11 transversely, i.e. radially in the present example.

Under such circumstances, and with reference to FIG. 4, the operator levels the connection course 13' by flattening it and possibly also levels at least one course of cells 13" adjacent to the connection course 13'. As a result, the course(s) of cells 13', 13" surrounding the internal orifice no longer has/have any cavities.

The internal orifice 11 is then defined by a connection surface 14 that is smooth and that no longer has any cavities. This encourages adhesion of a film of intumescent adhesive.

Furthermore, the first internal dimensions D2' of the internal orifice become greater than the peripheral dimensions D1 of the fastener element.

The operator then inserts the fastener element into the space 12 for receiving it that has been prepared inside the core 10 during the preparation stage or the assembly stage depending on the variant of the method.

It can be seen that the side wall 51 of the fastener element is spaced apart from the connection surface by a gap 15.

If the gap 15 is too large, i.e. greater than a predetermined limit, and with reference to FIG. 5, the operator proceeds to dock the core 10 around the fastener element 50. The operator moves each cell of the connection course 13', or preferably of a course 13" adjacent to the connection course 13', manually up towards the fastener element 50 along arrows F, in such a manner as to avoid damaging the surface quality of the connection 14.

With reference to FIG. 6, the core 10 includes at least one peripheral course 16 of cells. During the preparation stage, and in the same manner as for the connection course, the peripheral course is pressed back so as to be leveled, possibly together with at least one course adjacent to the peripheral course 16. The cavities in the peripheral course and in the adjacent courses that are leveled are then flattened. This produces a peripheral wall 17 that is smooth.

The peripheral wall may then be covered in a film of intumescent adhesive that performs the function of a finishing layer.

Optionally, it is also possible to bring a fastener element into position against said peripheral wall.

With reference to a first variant shown in FIG. 6, the peripheral course 16 is cut to have a chamfer so as to make it easier to implement a fastener element 50 of the outer rule type, as shown. For this purpose, the peripheral course 16 and/or a side wall of the outer rule is covered in at least one layer of a film of intumescent adhesive.

FIG. 7 presents a second alternative variant arrangement at the periphery of a fastener element.

The fastener element 50 is then placed against the peripheral course 16 of the core. In addition, the top outer wall 20 projects from the core 10 and the projecting portion 20' of said top outer wall 20 is folded so as to be pressed down against the side wall 51 of the fastener element 50.

In FIG. 8, the invention serves to make it easy to implement a fastener element 50 that is H-shaped, being provided with a body 53 leading to two flanges or collars 54, 55.

A complementary cellular structure 52 is then arranged against the body 53 and between the flanges 54, 55, an internal zone of the complementary cellular structure 52 being fabricated to said body 53, e.g. via at least one layer of a film of intumescent adhesive 56.

An outer zone of this complementary cellular structure 52 then represents the side wall 51 of the fastener element and it is covered in at least one layer of a film of intumescent adhesive.

It should be observed that the outer courses of the outer zone of said complementary cellular structure 52 may be leveled using the above-described method.

In addition, it may be observed that this method makes it possible to use an H-shaped fastener element that does not project from the outer walls but that, on the contrary, is situated in the plane of said outer walls.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of fabricating a panel comprising a core made of honeycomb material having a plurality of cells and encased by top and bottom outer walls defining between them an enclosure for receiving the core, the panel incorporating at least one fastener element that is accessible from at least one outer wall of the panel and that is suitable for co-operating with complementary fastener means of a structure, which method comprises during a preparation stage:

fabricating the top outer wall, and cutting out at least one outer orifice per fastener element that is to open out into the top outer wall;

fabricating the bottom outer wall;

cutting out a plate of honeycomb material to fabricate the core, and perforating one internal orifice per fastener element in the core in order to provide a space for receiving the fastener element; and coating at least one layer of a film of intumescent adhesive on a connection side wall of the fastener element that is to be connected to the core;

and then, during an assembly stage following the preparation stage and during which the panel is assembled:

placing the top outer wall on a molding bench;

covering the top outer wall in a film of adhesive, and then applying the core against the top outer wall, the fastener element being arranged in the corresponding space in the core for receiving it equally well either during the preparation stage after perforating the internal orifice, or after the core has been arranged on the top outer wall;

covering the core in a film of adhesive and then applying the bottom outer wall against the core;

and then polymerizing the assembly comprising the top outer wall, the core provided with the fastener element, and the bottom outer wall in order to obtain the panel provided with the fastener element wherein the fastener element has given first internal dimensions, each internal orifice cut out in the core presents peripheral dimensions smaller than the first internal dimensions, being defined by a connection course of cells of the core, and the connection course of cells is pressed back so as to flatten at least the connection course of cells in order to obtain a smooth connection surface around the internal orifice; and wherein after inserting a fastener element in a space for receiving it, the connection course is moved towards the fastener element so as to minimize a gap between the connection course and a film of intumescent adhesive surrounding the side wall of the fastener element.

2. A method according to claim 1, wherein during the preparation stage at least one outer orifice is cut out in the bottom outer wall.

3. A method according to claim 1, wherein at least one outer orifice is cut out while providing some minimum peripheral clearance in order to accommodate assembly tolerances.

4. A method according to claim 1, wherein, during the preparation stage, the plate includes a peripheral course of cells and the peripheral course of cells is pressed back to level at least the peripheral course and obtain a smooth peripheral surface.

5. A method according to claim 4, wherein the peripheral course of cells is cut to have a chamfer.

6. A method according to claim 4, wherein the peripheral course is coated in at least one layer of a film of intumescent adhesive and then an outer rule is applied against the peripheral course.

7. A method according to claim 1, wherein prior to putting at least one layer of film of intumescent adhesive into place around the side wall of the fastener element, roughness is formed in the side wall.

8. A method according to claim 1, wherein the bench has at least one positioning peg for positioning a fastener element, and during the assembly stage, the fastener element is positioned around the positioning peg.

9. A method according to claim 1, wherein, after placing the bottom outer wall on the core, the bottom outer wall is covered in covering tooling to provide distributed pressure on the outer wall.

10. A method according to claim 1, wherein the fastener element comprises a body for positioning in said core, and during the preparation stage, a complementary cellular structure provided with the side wall is arranged around the body, at least one layer of a film of intumescent adhesive being arranged between the body and the complementary cellular structure.

11. A method according to claim 1, wherein the fastener element is protected by means of a removable protective film suitable for being withdrawn after polymerization.

* * * * *